US012020338B2

(12) United States Patent
Carone

(10) Patent No.: US 12,020,338 B2
(45) Date of Patent: Jun. 25, 2024

(54) AUTONOMOUS PROPERTY MONITORING

(71) Applicant: Alarm.com Incorporated, Tysons, VA (US)

(72) Inventor: John Carone, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 250 days.

(21) Appl. No.: 17/366,444

(22) Filed: Jul. 2, 2021

(65) Prior Publication Data

US 2021/0334918 A1 Oct. 28, 2021

Related U.S. Application Data

(63) Continuation of application No. 15/903,362, filed on Feb. 23, 2018, now Pat. No. 11,055,797.

(Continued)

(51) Int. Cl.
| | |
|---|---|
| *G06Q 50/163* | (2024.01) |
| *B25J 5/00* | (2006.01) |
| *B25J 9/00* | (2006.01) |
| *B64C 39/02* | (2023.01) |
| *B64U 101/30* | (2023.01) |
| *G06V 20/20* | (2022.01) |

(Continued)

(52) U.S. Cl.
CPC .......... *G06Q 50/163* (2013.01); *G06V 20/20* (2022.01); *H04L 12/2825* (2013.01); *H04W 4/33* (2018.02); *B25J 5/00* (2013.01); *B25J 9/00* (2013.01); *B64C 39/02* (2013.01); *B64U 2101/30* (2023.01)

(58) Field of Classification Search
None
See application file for complete search history.

(56) References Cited

U.S. PATENT DOCUMENTS

| | | |
|---|---|---|
| 5,967,975 A | 10/1999 | Ridgeway |
| 7,173,525 B2 | 2/2007 | Albert |

(Continued)

FOREIGN PATENT DOCUMENTS

CN 1799786 A 7/2006

OTHER PUBLICATIONS

Sung, Ja-Young, et al. ""My Roomba is Rambo": intimate home appliances." UbiComp 2007: Ubiquitous Computing: 9th International Conference, UbiComp 2007, Innsbruck, Austria, Sep. 16-19, 2007. Proceedings 9. Springer Berlin Heidelberg, 2007.*

*Primary Examiner* — Fahd A Obeid
*Assistant Examiner* — Donald J Edmonds
(74) *Attorney, Agent, or Firm* — Fish & Richardson P.C.

(57) ABSTRACT

Techniques are described for automating aspects of the property condition monitoring process to efficiently determine a present property condition, and perform various actions associated with the determined property condition. In some implementations, a first set of image data for a region of the property is obtained prior to a start of the rental period. A determination that the rental period has ended at the property is made. A second set of image data for the region of the property is obtained in response to the determination. A representation of a difference between the first set of image data and the second set of image data is determined. An indication of the representation of the difference between the first set of image data and the second set of image data is provided for output to a computing device of a user associated with the property.

20 Claims, 6 Drawing Sheets

Related U.S. Application Data

(60) Provisional application No. 62/463,093, filed on Feb. 24, 2017.

(51) Int. Cl.
  *H04L 12/28* (2006.01)
  *H04W 4/33* (2018.01)

(56) References Cited

U.S. PATENT DOCUMENTS

| | | |
|---|---|---|
| 7,765,171 B2 | 7/2010 | Hinchey et al. |
| 7,882,394 B2 | 2/2011 | Hosek et al. |
| 8,172,154 B1 | 5/2012 | Figley et al. |
| 8,618,934 B2 | 12/2013 | Belov et al. |
| 8,924,019 B2 | 12/2014 | Tang |
| 9,061,736 B2 | 6/2015 | Smith |
| 9,168,315 B1 | 10/2015 | Scaringe et al. |
| 9,820,625 B2 | 11/2017 | T P et al. |
| 10,004,823 B2 | 6/2018 | Reid et al. |
| 10,173,773 B1 | 1/2019 | Flick |
| 10,445,796 B2 | 10/2019 | Ahroon |
| 10,453,149 B1 | 10/2019 | Gaudin et al. |
| 10,499,785 B2 | 12/2019 | Setchell et al. |
| 10,579,060 B1 | 3/2020 | Santana Li et al. |
| 2008/0047092 A1 | 2/2008 | Schnittman et al. |
| 2011/0040692 A1* | 2/2011 | Ahroon .................. G06Q 99/00 705/500 |
| 2011/0282712 A1 | 11/2011 | Amos et al. |
| 2012/0047082 A1 | 2/2012 | Bodrozic |
| 2012/0116803 A1* | 5/2012 | Reid .................... G16H 40/20 705/2 |
| 2014/0076224 A1* | 3/2014 | Smith .................... B62D 55/32 114/221 R |
| 2014/0201571 A1 | 7/2014 | Hosek et al. |
| 2014/0207282 A1* | 7/2014 | Angle .................... G05B 15/02 901/1 |
| 2014/0363043 A1 | 12/2014 | Bernal et al. |
| 2015/0193864 A1* | 7/2015 | Allison .............. G06Q 30/0645 705/5 |
| 2015/0205298 A1* | 7/2015 | Stoschek ................ B60Q 5/005 901/1 |
| 2016/0139067 A1* | 5/2016 | Grace .................... B08B 13/00 702/130 |
| 2016/0197999 A1* | 7/2016 | Chun .................... H04L 67/567 709/217 |
| 2017/0068926 A1* | 3/2017 | Eom .............. G06Q 10/063118 |
| 2017/0091691 A1* | 3/2017 | Adam .............. G06Q 10/06313 |
| 2017/0185849 A1 | 6/2017 | High et al. |
| 2017/0187993 A1* | 6/2017 | Martch .................. G05B 15/02 |
| 2018/0053129 A1 | 2/2018 | Cheng et al. |

* cited by examiner

200

| OBTAIN DATA INDICATING ONE OR MORE OBJECTS LOCATED WITHIN A PROPERTY AND A PREVIOUSLY DETERMINED STATUS FOR EACH OF THE ONE OR MORE OBJECTS   210 |

| OBTAIN SENSOR DATA ASSOCIATED WITH THE ONE OR MORE OBJECTS   220 |

| DETERMINE A PRESENT STATUS FOR EACH OF THE ONE OR MORE OBJECTS BASED ON THE OBTAINED SENSOR DATA   230 |

| PROVIDE DATA INDICATING THE PRESENT STATUS FOR OUTPUT   240 |

AUTONOMOUS PROPERTY MONITORING

CROSS-REFERENCE TO RELATED APPLICATIONS

This application is a continuation of U.S. application Ser. No. 15/903,362, filed Feb. 23, 2018, now allowed, which claims the benefit of U.S. Provisional Patent Application No. 62/463,093, filed on Feb. 24, 2017 and titled "AUTONOMOUS PROPERTY MONITORING." Both of these prior applications are incorporated by reference in their entirety.

TECHNICAL FIELD

This disclosure relates to home monitoring technology.

BACKGROUND

Property management can refer to the operation, control, and monitoring of personal objects, equipment, tooling, and/or physical capital assets that are associated with a property. This can involve the processes, systems, and manual procedures needed to manage a life cycle of a property including acquisition, control, accountability, responsibility, maintenance, utilization, and disposition. In some instances, operations associated with property management may be performed based on data collected by a property monitoring system.

SUMMARY

Condition monitoring for properties (e.g., rental properties) are often manually conducted by inspectors or maintenance personnel associated with a property management company. For instance, an inspector may perform a physical inspection to manually evaluate the present condition of a property once a tenant or temporary renter has vacated the property premises. However, such inspections can often be time-consuming because they require the inspector to carefully inspect different regions of the property to identify, for example, device malfunctions, property damage, and regulation compliance. In addition, such inspections often require the inspector to manually maintain documentation identifying whether maintenance or repair costs are to attributed to the renter/tenant, or to the landlord under applicable housing laws and regulations.

Accordingly, techniques are described for automating aspects of the property condition monitoring process to enable a user (e.g., a property owner, a property tenant, or a temporary occupant) or an entity (e.g., a property management company, a home security company) to efficiently determine a present property condition, and perform various actions associated with the determined property condition. For instance, a system may initially determine a baseline (or initial) condition for a property prior to an occupant (e.g., a renter, a tenant) obtaining possession over the property. Once the occupant has vacated the property premises, the system may determine a present (or updated) condition for the property. The system may collect various types of data and/or information associated with the baseline and present conditions, which can then be compared manually or automatically to identify a set of maintenance-related operations to be performed at the property.

In general, the architecture of the system may enable the property condition to be determined autonomously and automatically in response to event triggers such as an occupant check-in and/or an occupant check-out. For instance, in response to obtaining data indicating that an occupant has recently vacated the premises, the system may automatically deploy an autonomous device to navigate through the premises of the property and perform monitoring operations to capture data indicating a present property condition (e.g., collecting pictures of designated locations and/or objects within the property).

The system may then use the captured data to, for example, prepare inspection guidelines that assist an inspector and/or maintenance personnel associated with a property management company to perform actions related to of the premises of the property. For example, the inspection guidelines may indicate specific regions of interest within the property, or the identification of objects that require a follow-up inspection. In other examples, the inspection guidelines may also indicate regions that are determined to be in good condition to help the inspector efficiently perform the inspection by spending more time in areas that need follow-up manual verification and avoid areas that are automatically verifiable.

The automatic condition monitoring techniques described throughout also provide various advantages over other types of property condition monitoring techniques using stationary monitoring devices (e.g., security cameras). For example, because the system utilizes an autonomous device that is capable of being deployed to a property and being located in regions that are not visible to an occupant, a property management company may not need to place security cameras throughout the property to monitor an occupant's usage of the property. In another example, because the autonomous device can automatically navigate through the property once the occupant has vacated, the property management company may use the autonomous device to perform a first-pass inspection without needing an inspector to be physically present in the property. In yet another example, the system may also enable the autonomous device to exchange data communications with an existing property monitoring system to collect various types of data (e.g., motion data, occupancy data, etc.) associated with the occupant's usage of the property. The collected data can then be used to determine a condition of the property once the occupant has vacated the property premises.

In one general aspect, a computer-implemented method may include: obtaining, by an autonomous device, data indicating (i) one or more objects that are located within a property, and (ii) a previously determined status for each of the one or more objects; obtaining, by the autonomous device, sensor data associated with the one or more objects; determining, by the autonomous device, a present status for each of the one or more objects based on the obtained sensor data; and providing, by the autonomous device and for output to one or more computing devices that are remote from the property, data indicating the present status for each of the one or more objects.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

In the drawings, like reference numbers represent corresponding parts throughout.

DETAILED DESCRIPTION

Figure 1:
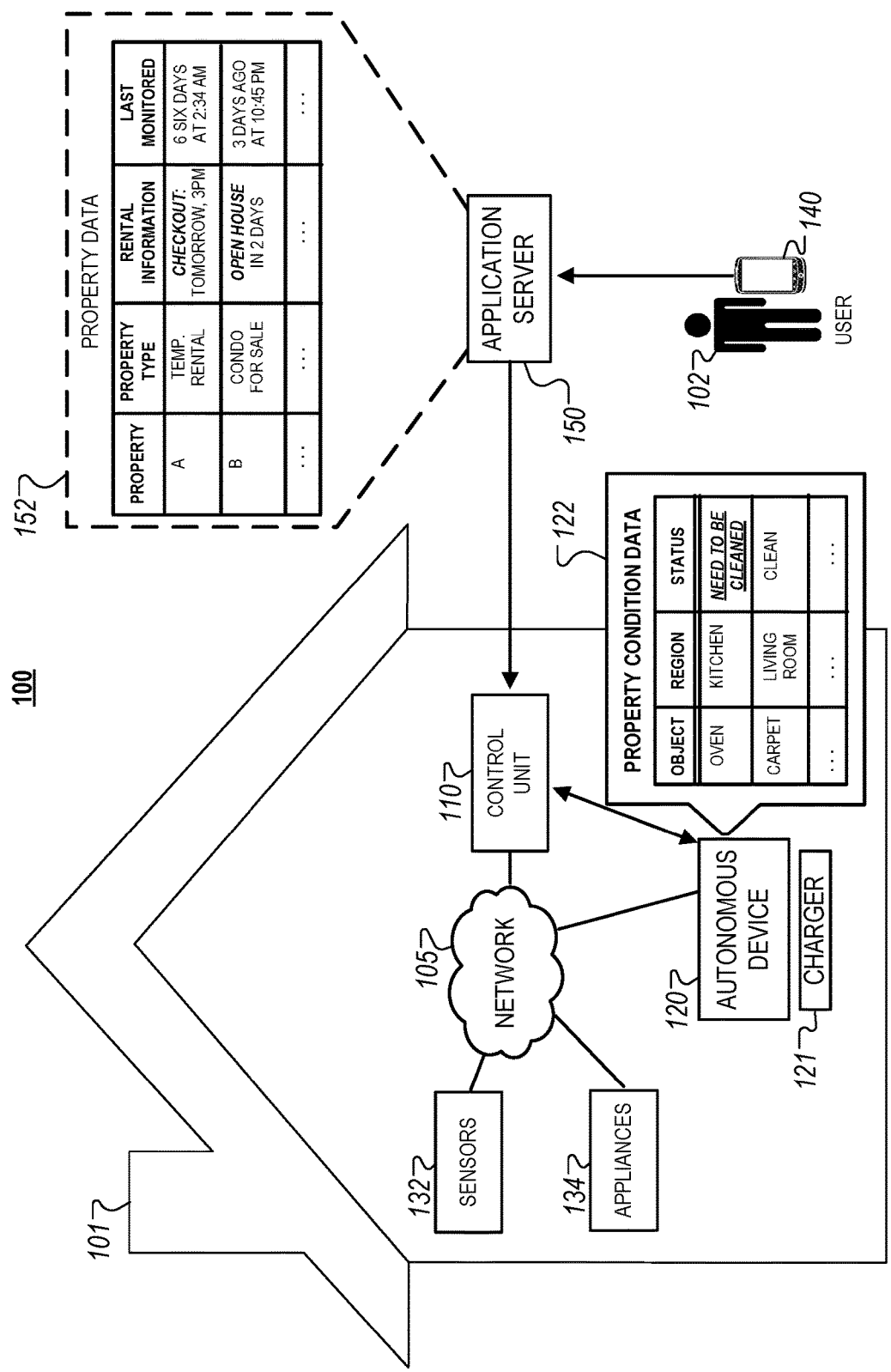
FIG. 1 illustrates an example of a system that is capable of using autonomous property condition tracking techniques.

In general, techniques are described for automating aspects of the property condition monitoring process to enable a property management company to efficiently determine a present property condition, and perform various actions associated with the determined property condition. For instance, a system may initially determine a baseline (or initial) condition for a property prior to an occupant (e.g., a renter, a tenant) obtaining possession over the property. Once the occupant has vacated the property premises, the system may determine a present (or updated) condition for the property. The system may collect various types of data and/or information associated with the baseline and present conditions, which can then be compared manually or automatically to identify a set of maintenance-related operations to be performed at the property.

As described throughout, a "status" refers to a determined indicator associated with a property condition. In some examples, a status may reflect a maintenance action to be taken within the property (e.g., "CLEAN," "NEED TO BE CLEANED"). In other examples, a status may reflect a physical condition associated with designated objects or regions within the property (e.g., "DAMAGED"). In each of these instances, the status may reflect a categorical assessment of an object or region within the property based on a selection from list of different statuses.

In some implementations, individual statuses may be determined for individual objects, as well as overall statuses for regions within the property or the entirety of the property. In such implementations, status information can be used to identify an overall property condition based on the aggregation of individual statuses. For example, an individual status may represent numerical score that reflects a predetermined attribute descriptive of a property condition. The values indicated individual statuses may then be combined for objects that are located in a shared region of the property to determine combined status for the shared region.

As described throughout, an "object" refers to any type of personal property that is placed within a property. In some examples, an object refers to tangible personal property that is considered valuable to its owner (e.g., a piece of artwork, antiques, jewelry, etc.). In other examples, objects can refer to items that a property administrator has designated to be of interest and subject to periodic monitoring. In addition, objects can also include items within the property that require periodic cleaning, maintenance and/or replacement between rental periods (e.g., towels, bedsheets, toilets, toilet paper, etc.).

As described in greater detail below, the status of an object can be used to determine if the object has been changed, moved, or otherwise removed from the property without permission/authorization from the property administrator. For example, if a location of an object that is being monitored has changed, then its corresponding present status can be used to indicate its updated located within the property. In this example, location tracking of an object using its status can be used to determine if the object has been moved within the property and/or removed from the property without the property administrator's permission. In another example, the object status can be used to detect if the object requires some action to be taken between successive rental periods (e.g., cleaning, maintenance, replacement, etc.). In this example, the object status can be used to indicate an action to be taken by an inspector and/or a maintenance personal after a rental period has ended.

As described throughout, an "occupant" refers to an individual that temporarily resides within, or has access to, a property. Examples of occupants include individuals that temporarily rent a property for short-time periods (e.g., 6-7 days), tenants that rent a property for a fixed time period specified by a lease agreement (e.g., one year), or prospective purchasers or buyers that participate in a property tour.

FIG. 1 illustrates an example of an electronic system 100 that is capable of using autonomous property condition tracking techniques. The electronic system 100 includes a control unit 110, an autonomous device 120, sensors 132, appliances 134, a user device 140, and an application server 150 connected over a network 105 within a property 101. The user device 140 can be associated with a user 102 such as an inspector that inspects the condition of the property 101 after an occupant has vacated the property premises. that is authorized to access the property 101. The application server 150 further includes a repository 152 for storing information associated with various properties including the property 101.

In general, the system 100 may deploy the autonomous device 120 at various time points to collect data associated with the property 101 (e.g., prior to the start of a rental period, after the termination of a rental period). Once deployed to the property 101, the autonomous device 120 may collect data used to monitor designated objects within the property 101 (e.g., items used by an occupant, items that require periodic maintenance, valuable property items, items that need to be cleaned). In some instances, an on-board camera of the autonomous device 120 may capture pictures of the designated objects to identify a location, placement, configuration, condition, and/or operability of an object for a corresponding time point when autonomous device 120 is deployed to the property 101. In other instances, the autonomous device 120 may additionally, or alternatively, obtain data that is collected by the sensors 132 prior to, or during, the deployment time period. For instance, the autonomous device 120 may obtain a video footage of the interior of the property captured by a security camera placed within the property 101, temperature data collected by a thermostat, or other types of sensor data.

The data collected by the autonomous device 120 during a deployment may then be used to generate property condition data 122. In some implementations, the property condition data 122 is generated on-board by the autonomous device 120. In other implementations, the property condition data may additionally or alternatively be generated by the control unit 110, the application server 150, or a combination thereof.

The property condition data 122 may indicate determined statuses for designated objects that were monitored by the autonomous device 120 during a recent deployment. In the example depicted in FIG. 1, the determined status for the designated objects indicates whether the object requires a maintenance operation to be performed (e.g., "CLEAN" or "NEED TO BE CLEANED"). In other examples, the determined status can include, for example, a physical condition of an object, the placement/location of an object within the property, among other types of usage or maintenance indicators. In some implementations, the property condition data 122 may specify a property status reflecting an overall condition of the property based on combining the respective determined statuses for objects that monitored by the autonomous device 120.

Once generated, the property condition data 122 can be transmitted to the application server 150 for storage in the repository 152, stored locally on the control unit 110, provided for output to the user device 140, or a combination of each. For instance, if stored locally on the control unit 110 or remotely on the application server 150, the property condition data 122 can be used to establish historical condition record that is associated with the property or rental data included within the repository 152.

In other instances, if the property condition data 122 is provided for output to the user device 140, then the statuses indicated within the property condition data 122 can be used to improve the inspection and/or maintenance of the property 101 after a rental period. For example, the property condition data 122 can be used to inform the user 102, or a property management company that manages the property 101, to efficiently perform various maintenance operations. In such an example, the property condition data 122 may identify objects and/or regions within the property 101 that are determined to require further investigation by the user 102 (e.g., detected property damage, device malfunctioning, necessary cleaning, etc.). A notification with instructions on performing an investigation at the property 101 can then be transmitted to the user device 140 when the user 102 arrives at the property 101 to perform an investigation or a maintenance. In other instances, the property condition data may additionally, or alternatively, be transmitted to the application server 150 for storage within the repository 152. In such instances, the property condition data collected after each rental period can be stored to create a historical rental record associated with the property 101.

In some implementations, the property condition data 122 can be provided for output to other entities or users that are not associated with a property management company. For example, the property condition data 122 can be provided for output to a home security company that provides property monitoring services for the property 101. In this example, the property condition data 122 can be used to identify an occurrence of a potential security breach or other emergency condition within the property 101. In another example, the property condition data 122 can be provided for output to a prospective tenant and/or purchaser. In this example, the property condition data 122 can be used to enable the prospective tenant or purchaser to remotely view the present condition of a property to determine if he/she is interested in renting or purchasing the property 101. As described in greater detail below, the property condition data 122 that is provided for output can include both data indicating a present condition and data indicating historical property condition.

As an example, the system 100 initially deploys the autonomous device 120 to the property 101 prior to an occupant check-in for a rental period. The autonomous device 120 then monitors the property to determine a baseline (or initial) property condition. Once the system 100 determines that the occupant has vacated the premises after the termination of the rental period, the system 100 deploys the autonomous device 120 the property 101 once again to determine a present (or updated) property condition. The system 100 then enables a comparison of the baseline property condition and the present property condition to identify the maintenance operations that are needed to be performed at the property 101.

In some implementations, the comparison of the baseline and the present property conditions may be performed automatically by one or more components of the system 100 (e.g., the autonomous device 120, the control unit 110, the application server 150). In other implementations, the comparison is manually performed by a system administrator associated with the application server 150. In each of these implementations, baseline and present property condition data include different object statuses that are determined based on data collected by the autonomous device 120 and/or the sensors 132 as described in greater detail below. In this regard, the initial comparison of property condition data from two time points enables the system 100 to preliminarily identify actions to be taken at the property without requiring an inspector to be physically present within the property 101.

Referring now to the components of system 100, the network 105 is configured to enable exchange of electronic communications between devices connected to the network 105. For example, the network 105 may be configured to enable exchange of electronic communications between the control unit 110, the autonomous device 120, the sensors 132, the appliances 134, the user device 140, and the application server 150.

The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway.

The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The control unit 110 includes a controller and a network module. The controller is configured to control a monitoring system (e.g., a home alarm or security system) that includes the autonomous device 120. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the autonomous device 120.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the autonomous device 120 to communicate over a local area network and/or the Internet. The network module also may be a voice band modem configured to enable the alarm panel to communicate over the telephone lines of Plain Old Telephone Systems (POTS).

The control unit 110 may store sensor and image data received from the system 100 and perform analysis of sensor and image data received from the system 100. Based on the analysis, the control unit 110 may communicate with, and control aspects of, the autonomous device 120, the sensors 132, the appliances 134, or the user device 140. In addition, the control unit 110 may store dynamic object data (e.g., based on sensor data collected by the sensors 132), or information associated with dynamic object data (e.g., historical status information associated with dynamic objects). The control unit 110 may also store data associated with the dynamic multi-dimensional spatial representations that are determined for the property 101. For example, the control unit 110 may store historical data associated with previously generated spatial representations of the property 101 over a specified period of time.

The autonomous device 120 may be any type of electronic device that is capable of moving and taking actions that assist in security monitoring. For example, the autonomous device 120 may be an unmanned device (e.g., a drone device), a robotic device, or any other type of device that is capable of moving throughout the property 101 based on automated control technology and/or user input control provided by a user. In some examples, the autonomous device 120 may be able to fly, roll, walk, or otherwise move about the property 101.

In various implementations, the autonomous device 120 may be a helicopter type device (e.g., a quad copter), a rolling helicopter type device (e.g., a roller copter device that can fly and also roll along the grounds, walls, or ceiling), a land vehicle type device (e.g., automated cars that drive around a property), or a plane type device (e.g., unmanned aircraft). In some instances, the autonomous device 120 may be a robotic device that is intended for other purposes and associated with the system 100 for use in appropriate circumstances. For instance, a security drone may be associated with the system 100 as the autonomous device 120 and may be controlled to take action responsive to system events.

The autonomous device 120 can be configured to automatically navigate within the property 101. For instance, the autonomous device 120 may include sensors and control processors that guide movement of the autonomous device 120 within the property. The autonomous device 120 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The autonomous device 120 may include control processors that process output from the various sensors and control the autonomous device 120 to move along a navigational route that reaches the desired destination and avoids obstacles. In this regard, the control processors detect walls or other obstacles in the property and guide movement of the autonomous device 120 in a manner that avoids the walls and other obstacles.

In addition, the autonomous device 120 may store data that describes attributes of the property 101. For instance, the autonomous device 120 may store a floorplan and/or a three-dimensional model of the property 101 that enables the autonomous device 120 to navigate the property 101. During initial configuration, the autonomous device 120 may receive the data describing attributes of the property 101, determine a frame of reference to the data (e.g., a home or reference location in the property 101), and navigate the property 101 based on the frame of reference and the data describing attributes of the property 101.

Further, initial configuration of the autonomous device 120 also may include learning of one or more navigation patterns in which a user or a system administrator provides input to control the autonomous device 120 to perform a specific navigation action (e.g., fly to an upstairs bedroom and spin around while capturing video and then return to a home charging base). In this regard, the autonomous device 120 may learn and store the navigation patterns such that the autonomous device 120 may automatically repeat the specific navigation actions when instructed to assist a user during a detected emergency condition at the property.

In some implementations, the autonomous device 120 may include data capture and recording devices. In these examples, the autonomous device 120 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property.

In some implementations, the autonomous device 120 may include output devices. In these implementations, the autonomous device 120 may include one or more displays, one or more speakers, one or more projectors, and/or any type of output devices that allow the autonomous device 120 to communicate information to a nearby user. The one or more projectors may include projectors that project a two-dimensional image onto a surface (e.g., wall, floor, or ceiling) and/or holographic projectors that project three-dimensional holograms into a nearby space.

The autonomous device 120 also may include a communication module that enables the autonomous device 120 to communicate other devices of the system 100. The communication module may be a wireless communication module that allows the autonomous device 120 to communicate wirelessly. For instance, the communication module may be a Wi-Fi module that enables the autonomous device 120 to communicate over a local wireless network at the property. The communication module further may be a 900 MHz wireless communication module that enables the autonomous device 120 to communicate directly with the control unit 110. Other types of short-range wireless communication protocols, such as Bluetooth, Bluetooth LE, Z-wave, ZigBee, etc., may be used to allow the autonomous device 120 to communicate with other devices in the property.

The autonomous device 120 further may include processing and storage capabilities. The autonomous device 120 may include any suitable processing devices that enable the autonomous device 120 to operate applications and perform the actions described throughout this disclosure. In addition, the autonomous device 120 may include solid state electronic storage that enables the autonomous device 120 to store applications, configuration data, collected sensor data, and/or any other type of information available to the autonomous device 120.

The autonomous device 120 may be associated with a charging station 121. The charging station 121 may be located at a predefined or reference location within a property. The autonomous device 120 may be configured to navigate to the charging station 121 after successfully performing a particular specified action. For instance, after completing the specified action upon instruction by the control unit 110, the autonomous device 120 may be configured to automatically fly to and land on one of the charging station 121. In this regard, the autonomous device 120 may automatically maintain a fully charged battery in a state in which the autonomous device 120 are ready for use by the system 100.

The charging station 121 may be a contact-based charging stations and/or wireless charging stations. For contact based charging stations, the autonomous device 120 may have readily accessible points of contact that the autonomous device 120 are capable of positioning and mating with a corresponding contact on the charging station 121. For instance, a helicopter type robotic device may have an electronic contact on a portion of its landing gear that rests on and mates with an electronic pad of a charging station 121 when the helicopter type robotic device lands on the charging station 121. The electronic contact on the robotic device may include a cover that opens to expose the electronic contact when the robotic device is charging and closes to cover and insulate the electronic contact when the robotic device is in operation.

For wireless charging stations, the autonomous device 120 may charge through a wireless exchange of power. In these cases, the autonomous device 120 need only locate themselves closely enough to the wireless charging stations for the wireless exchange of power to occur. In this regard, the positioning needed to land at a predefined home base or reference location in the property may be less precise than with a contact-based charging station. Based on the autonomous device 120 landing at a wireless charging station, the wireless charging station outputs a wireless signal that the autonomous device 120 receive and convert to a power signal that charges a battery maintained on the autonomous device 120.

As described above, the autonomous device 120 may exchange communications with the control unit 110, the sensors 132, the appliances 134, the user device 140, and the application server 150 over the network 105 or any other suitable communication means. For example, the autonomous device 120 may utilize a wireless data pathway configured to transmit signals from the control unit 110, the sensors 132, the appliances 134, the user device 140, and the application server 150 to a controller. The control unit 110, the sensors 132, the appliances 134, the user device 140, and the application server 150 may continuously transmit sensed values to the controller, periodically transmit sensed values to the autonomous device 120, or transmit sensed values to the autonomous device 120 in response to a change in a sensed value.

In some implementations, the autonomous device 120 may additionally be used to perform routine surveillance operations on a property. For instance, the autonomous device 120 may be assigned to one or more particular properties within a geographic location and may routinely collect surveillance footage during specified time periods (e.g., after dark), which may then be transmitted to the application server 150 for transmitting back to each particular property owner. In such implementations, the property owner may receive the surveillance footage over the network 105 as a part of a service provided by a security provider that operates the application server 150. For example, transmissions of the surveillance footage collected by the autonomous device 120 may be part of a premium security service package provided by a security provider in addition to the routine drone emergency response service.

In some implementations, the autonomous device 120 may monitor the operation of the control unit 110, the sensors 132, the appliances 134, the user device 140, and/or the application server 150. For instance, the autonomous device 120 may enable or disable the devices located within a property based on a set of rules associated with energy consumption, user-specified settings, and/or other information associated with conditions prior to, during, or after performing a particular action.

In some implementations, the autonomous device 120 may be used as a replacement to a traditional security panel (e.g., the control unit 110) that is used to monitor and control the operations of the system 100. In other examples, the autonomous device 120 may coordinate monitoring operations with a separate security panel of the system 100. In such examples, the autonomous device 120 may monitor particular activities of the devices of the system 100 that are not monitored by the security panel, or monitor the operation of particular devices that are not monitoring by the security panel.

In some implementations, the autonomous device 120 is configured and managed by a service provider entity associated with the application server 150. In such implementations, the autonomous device 120 may be provided as device component of the system 100 when the sensors 132 and/or the control unit 110 is installed within a property. Alternatively, in other implementations, the autonomous device 120 may be an after-market device that is configured to exchange data communications with components of the system 100 (e.g., the control unit 110, the sensors 132, and/or the appliances 134) when the system 100 is already installed within the property. In this regard, the autonomous device 120 may be a device from the system 100 this is configured to perform the operations described throughout.

In some implementations, the system 100 may include multiple autonomous devices that exchange communications with one another to perform the monitoring operations described throughout. For example, a particular autonomous device may be designated to monitor a specified region of the property 101. Each autonomous device may then transmit collected data for each designated region to, for example, the control unit 110 and/or the application server 150, which then aggregates the collected data from each autonomous device. In such implementations, the multiple autonomous devices may operate as a distributed drone network to monitor region-specific property information.

The system 100 also includes one or more sensors or detectors. For example, the system 100 may include multiple sensors 132. The sensors 132 may include a contact sensor, a motion sensor, a glass break sensor, or any other type of sensor included in an alarm system or security system. The sensors 132 also may include an environmental sensor, such as a temperature sensor, a water sensor, a rain sensor, a wind sensor, a light sensor, a smoke detector, a carbon monoxide detector, an air quality sensor, etc. The sensors 132 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 may include a radio-frequency identification (RFID) sensor that identifies a particular article that includes a pre-assigned RFID tag.

In some implementations, the sensors 132 may include one or more cameras. The cameras may be video/photographic cameras or other type of optical sensing devices configured to capture images. For instance, the cameras may be configured to capture images of an area within a building monitored by the control unit 110. The cameras may be configured to capture single, static images of the area and also video images of the area in which multiple images of the area are captured at a relatively high frequency (e.g., thirty images per second). The cameras may be controlled based on commands received from the control unit 110.

The appliances 134 may be home automation devices connected to the network 105 that are configured to exchange electronic communications with other devices of the system 100. The appliances 134 may include, for example, connected kitchen appliances, controllable light sources, safety and security devices, energy management devices, and/or other types of electronic devices capable of exchanging electronic communications over the network 105. In some instances, the appliances 134 may periodically transmit information and/or generated data to the control unit 110 such that the control unit 110 can automatically control the operation of the appliances 134 based on the exchanged communications. For example, the control unit 110 may operate one or more of the appliances 134 based on a fixed schedule specified by the user. In another example, the control unit 110 may enable or disable one or more of the appliances 134 based on received sensor data from the sensors 132.

The user device 140 may be any type of personal electronic computing device that is associated with a property management company that operates the application server 150. The user device 140 may be one or more of a cellular telephone, smartphone, a tablet-computing device, a laptop computing device, a desktop computing device, a wearable device, or any other type of network-enabled electronic device.

The user device 140 may include a native application that enables communications with devices located within the property 101 through the application server 150. The native application refers to software/firmware programs running on the user device 140 that enable various features. For instance, the user device 140 may load or install the native application based on data received over a network 105 or data received from local media. The native application may run on various mobile device platforms associated with the user device 140.

In some implementations, the native application of the user device 140 identifies a geographic location associated with the user device 140 and communicates information identifying the geographic location. For example, the user device 140 having the native application may determine a geographic location of the user device 140 using GPS capabilities, and may communicate data identifying the geographic location to the application server 150. In some instances, the native application may check the location of the user device 140 periodically and may detect when a user is presently located inside or outside a property. The autonomous device 120 to determine the region of the property where the user is located within the property can then use location data associated with the user device 140.

Additionally, or alternatively, the user device 140 may communicate with the control unit 110 and/or the autonomous device 120 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The application server 150 may be an electronic device configured to provide monitoring services for the property 101. The application server 150 may exchange electronic communications with the control unit 110, the autonomous device 120, the sensors 132, the appliances 134, and the user device 140 over the network 105. For example, the application server 150 may obtain and store the property condition data 122 within the repository 152 to maintain a historical rental and/or maintenance record associated with the property 101.

In some implementations, the application server 150 is operated and/or maintained by, for example, a property management company that manages property rentals for multiple properties including the property 101. For example, the application server 150 may be associated with rental management system (e.g., through a web page or through a mobile application) that enables prospective occupants to make a rental selection of a property that is made available by the property management company. In such implementations, the user 102 can be an employee of the rental management company that inspects and/or performs an inspection of the property 101 prior to the start of a rental period, or after the termination of a rental period.

Alternatively, in other implementations, the application server 150 may instead by operated and/or maintained by a third party that is distinct from the property management company but otherwise has access to rental data associated with the property 101 (e.g., data included within the repository 152). In such implementations, the application server 150 may obtain property information from a system of the property management company for storage within the repository 152.

The application server 150 may be configured to monitor events (e.g., alarm events, emergency conditions, etc.) generated by the control unit 110 and/or the autonomous device 120. For example, the application server 150 may exchange electronic communications with the network module included in the control unit 110 to receive information regarding events (e.g., fire, carbon monoxide) detected by the control unit 110. The application server 150 also may receive information regarding events (e.g., alarm events) from the autonomous device 120.

The application server 150 may also store sensor and image data received from the system 100 and perform analysis of sensor and image data received from the system 100. Based on the analysis, the application server 150 may communicate with and control aspects of the control unit 110, the autonomous device 120, or the user device 140. In addition, the application server 150 may store dynamic object data (e.g., based on sensor data collected by the sensors 132), or information associated with dynamic object data (e.g., historical status information associated with dynamic objects). The application server 150 may also store data associated with the dynamic multi-dimensional spatial representations that are determined for the property 101. For example, the application server 150 may store historical data associated with previously generated spatial representations of the property 101 over a specified period of time.

In the example depicted in FIG. 1, the repository 152 includes property data for multiple properties (e.g., Property A and Property B), which includes associated information fields such as "PROPERTY TYPE," "RENTAL INFORMATION," and "LAST MONITORED." The information stored within the repository 152 can generally be used to, for example, determine when an occupant is scheduled to check-in or check-out of the property 101, monitor historical data associated with the property 101 (e.g., property condition data associated with prior rentals of the property 101), and/or track data collected by the monitoring system of the property 101 (e.g., data collected by the sensors 132, the appliances 134, the control unit 110, and/or the application server 150).

Figure 2:
FIG. 2 illustrates an example of a process for tracking the condition of a property.
Figure 2:
Figure 2:

FIG. 2 illustrates an example of a process 200 for tracking the condition of a property. Briefly, the process 200 may include obtaining data indicating one or more objects located within a property and a previously determined status for each of the one or more objects (210), obtaining sensor data associated with the one or more objects (220), determining a present status for each of the one or more objects based on the obtained sensor data and the previously determined status for each of the one or more objects (230), and providing data indicating the present status for output (240).

In general, the operations of the process 200 can be performed by the autonomous device 120, the control unit 110, the application server 150, or a combination thereof. For example, in some implementations, the operations may be locally executed by the autonomous device 120 and/or the control unit 110. Alternatively, in other implementations, some of the operations may be locally executed within the property 101 by the autonomous device 120 and/or the control unit 110, and other operations may be performed remotely by the application server 150. However, for simplicity and brevity, the descriptions below are provided in reference to the autonomous device 120.

In more detail, the process 200 may include obtaining data indicating one or more objects located within a property and a previously determined status for each of the one or more objects (210). The autonomous device 120 may initially receive an instruction to be deployed to the property 101. As described above, this instruction may be transmitted in response to determining that an occupant has recently vacated the premises of the property 101. The autonomous device 120 may then obtain baseline property condition data that indicates statuses for objects within the property 101 prior to the start of the rental period.

The baseline property condition data may be obtained at different time points in relation to the deployment of the autonomous device 120 after an occupant has vacated from the property premises. For example, in some implementations, the autonomous device may obtain the baseline property condition data prior to or during deployment to compare baseline statuses of objects to present statuses determined for the objects during the deployment. In such implementations, the autonomous device 120 may be capable of comparing the baseline object statuses and their corresponding present object statuses in real time, and in response to detecting an annotation or an abnormality, transmit an alert notification to the control unit 110 and/or the application server 150.

In other implementations, the autonomous device 120 may proceed with deployment and obtain the baseline property condition data after collecting data during the deployment in step 220. In such implementations, the autonomous device 120 may compare the baseline property condition data and present property condition data, as described below, after completing the deployment at the property 101.

The process 200 may include obtaining sensor data associated with the one or more objects (220). After being deployed to the property 101, the autonomous device 120 may collect various types of data associated with the property 101. In some implementations, the obtained data can include data collected by on-board sensors of the autonomous device 120. For example, the autonomous device 120 may capture pictures of designated objects within the property 101 as described above. In other implementations, the obtained data can additionally, or alternatively, include data collected by external sensors such as the sensors 132. For example, the autonomous device 120 may collect activity data associated with an object during the rental period that is collected by an activity sensor placed with the property 101.

In other implementations, the autonomous device 120 can also obtain other types of monitoring data that is not necessarily associated with a particular object, but indicates events that took place within the property 101 during the rental period (e.g., event logs associated with an HVAC system of the property 101, detected changes in ambient temperature during the rental period, energy consumption during the rental period).

The process 200 may include determining a present status for each of the one or more objects based on the obtained sensor data and the previously determined status for each of the one or more objects (230). The autonomous device 120 may determine a present status for designated objects within the property 101 based on the data obtained in step 220. For instance, as described in greater detail below, the autonomous device 120 may use various image processing, recognition, and/or classification techniques to determine the present status for an object. The present status for various objects can be included within the property condition data 122 as described above with respect to FIG. 1.

As an example, the autonomous device 120 may use such techniques to identify certain visual attributes within a captured photograph that are associated with dust and/or dirt, indicating that an object is dirty and requires cleaning. In another example, the autonomous device 120 may use various detection techniques to identify a set of predetermined visual attributes (e.g., an unmade bed, carpet stains, surface scratches and/or scuffs) that are indicative of a physical condition of an object. In some implementations, the autonomous device 120 may be capable of using deep learning and/or machine learning techniques to automatically identify the occurrence of the predetermined attributes within a captured photograph of an object.

As described above, the present status may indicate, for example, whether a maintenance operation needs to be performed on an object, a detected physical condition of an object, among other types of information (e.g., a placement, location, configuration of an object within the property 101). The autonomous device 120 may make such determinations based on comparing the baseline property condition data obtained in step 210 and the present property condition data obtained in step 220. For instance, the autonomous device 120 may use the comparison to determine whether an occupant has moved an object to a different location within the property 101, whether the physical condition of an object has changed during the rental period, whether an occupant has used an object, among other types of information. In some examples, the comparison of the property condition data can be used determine whether the actions of an occupant during the rental period have caused property damage. In such examples, the present status information can be used to identify the occupant's liability for the property damage caused.

The process 200 may include providing data indicating the present status for output (240). The autonomous device 120 may provide the property condition data 122 for output to various devices. For example, in some implementations, the property condition data 122 may be provided for output to the control unit 110 for local storage and/or to the application server 150 for remote storage. As described above, in such implementations, the status information included within the property condition data 122 can be used to progressively track historical property conditions over different rental periods. In other implementations, status information included within the property condition data 122 can be used to improve the efficiency of inspecting and/or performing maintenance operations at the property 101. For example, the status information can flag areas of the property for the user 102 to focus on during an inspection, and/or a list of monitoring operations that need to be performed within the property 101.

Figure 3:
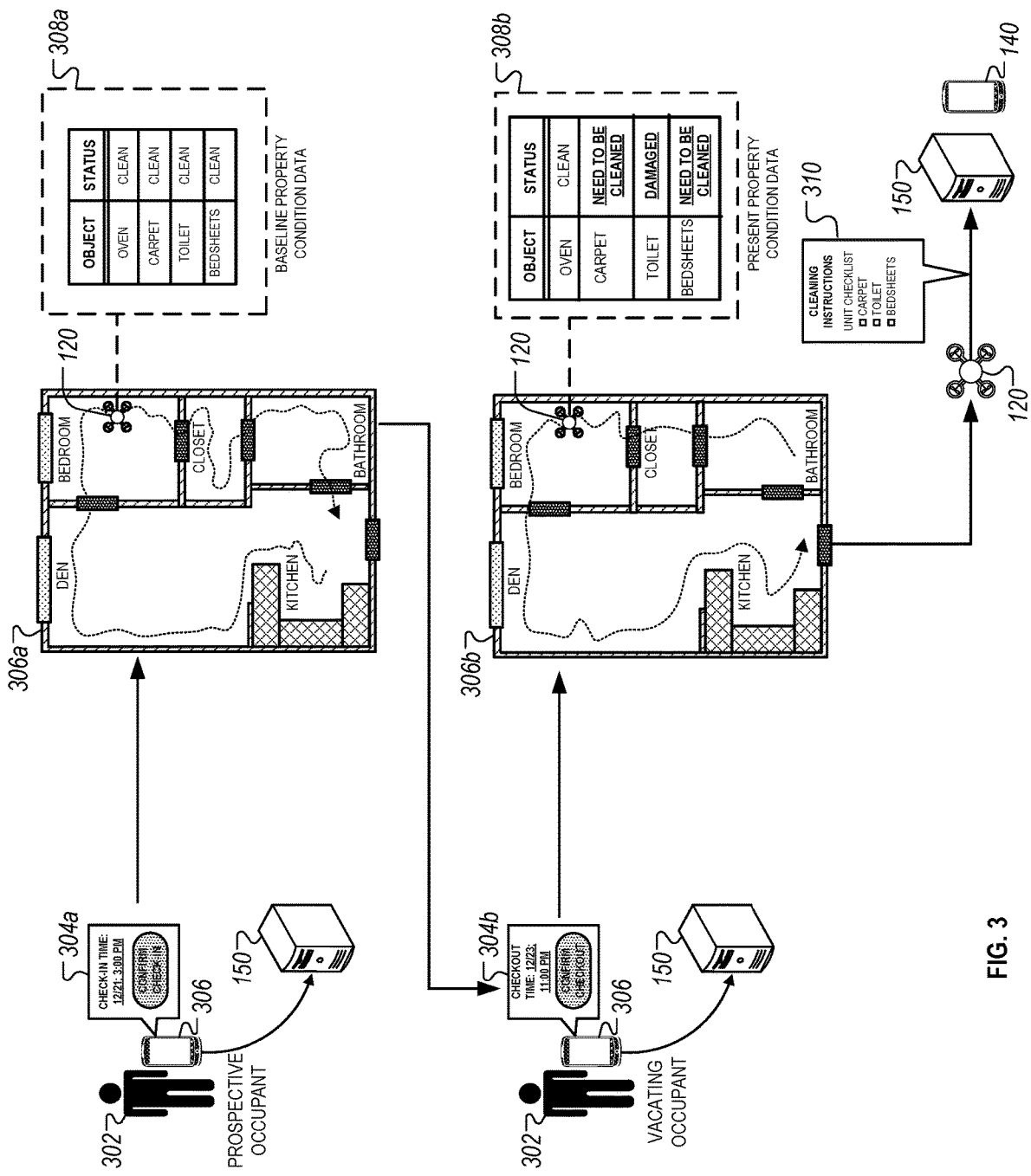
FIG. 3 illustrates an example of a technique for tracking status information associated with the condition of a rental property.

FIG. 3 illustrates an example of a technique for tracking status information associated with the condition of a rental property. In the example, autonomous property condition tracking techniques described above are illustrated in relation to a property rental. An occupant 302 initially select a property to rent through an interface 304a provided on the user device 140. The occupant 302 may access the interface 304a through any suitable means, for example, a webpage or a mobile application that is associated with a property management company. The occupant 302 may provide inputs on the interface 304a that rental information associated with a selected property (e.g., a check-in date, check-in time). The rental confirmation can then be transmitted to the application server 150, which allows the system 100 to determine when a property (e.g., the property 101) has been confirmed for rental by the occupant 302.

Once the property 101 has been confirmed to be rented, the system 100 may generate instructions to deploy the autonomous device 120 to the property 101. In response, the autonomous device 120 may automatically navigate through an indoor environment 306a of the property 101 and collect data associated with designated objects. As described above, the autonomous device 120 may, for example, use various identification techniques to locate designated objects to be monitored within the indoor environment 306a and capture data associated with the designated objects (e.g., photographs captured by on-board cameras of the autonomous device 120, data collected by the sensors 132, environment data associated with the property 101).

The autonomous device 120 may use the collected data to generate baseline property condition data 308a for the designated objects using techniques described above. The baseline property condition data 308a may include baseline statuses for each designated object. In the example depicted, the baseline property condition data 308a specifies a device and a corresponding object status. The statuses of each of the designated objects in this example are "CLEAN," which indicates that the indoor environment 306a has been recently cleaned by a maintenance personnel and is ready for rental.

In some implementations, the determination of the property condition data 308a can be used to verify that the property 101 is ready to be rented. In such implementations, the system 100 may deploy the autonomous device 120 to the property 101 after it has been cleaned/repaired to confirm that the property 101 is actually ready to be rented by the occupant 302. For example, if the baseline property condition data 308a indicates an unexpected aberration and/or abnormality, then an alert notification may be transmitted to the application server 150 to schedule a supplemental inspection at the property 101 prior to the start of the rental period for the occupant 302.

In some implementations, during the rental period, the autonomous device 120 may navigate to a location of the property 101 so that it can unobtrusively monitor the condition of the property 101 during the rental period. For example, the autonomous device 120 may be located in a closet and/or a backyard where it is not visible to the occupants that rent the property 101. In this configuration, the communication module of the autonomous device 120 may exchange communications with the sensors 132 inside the property 101 to obtain various types of monitoring data associated with the property 101 (e.g., detected motion data, occupancy data, activity data, set point temperature data, HVAC configuration data). The autonomous device 120 may then collect, aggregate, and package the collected data for transmission to the control unit 110 and/or the application server 150.

In some instances, the autonomous device 120 may be configured to automatically respond to a detected emergency condition within the property 101 based on the data collected by the sensors 132. For example, if the collected data indicates that smoke has been detected within the property 101, the autonomous device 120 may automatically adjust its present configuration in order to respond to navigate to the location of the property 101 where the smoke has been detected. In such implementations, the autonomous device 120 may use various navigational techniques to assist occupants that are presently located within the property 101 during the detected emergency condition. In this regard, the Once the rental period has ended, or is close to ending, the occupant 302 may provide a user input on an interface 304b to indicate that he/she has checked out of the property 101. The interface 304b may be access through either a webpage associated with the property management company (as described above with respect to the interface 304a) or through the application that the occupant 302 used to access the interface 304a to check into the property. As discussed above, a corresponding notification may then be sent to the application server 150 indicating that the occupant 302 has checked out of the property 101 and that the property 101 is now presently vacant.

Once the property 101 has been confirmed to be vacant, the system 100 may generate instructions to deploy the autonomous device 120 to the property 101. In response, the autonomous device 120 may automatically navigate through an indoor environment 306b of the property 101 after the rental period has ended. During this deployment, the autonomous device 120 collects data associated with the designated objects that were previously monitored and included within the baseline property condition data 308a. In some implementations, the autonomous device 120 may use the substantially same identification and/or verification techniques to locate the designated objects within the indoor environment 306b and capture data associated with the designated objects as described above with respect to the indoor environment 306a.

Alternatively, in other implementations, the autonomous device 120 may use more specific tracking or monitoring techniques to identify changes to the condition, location, placement, and/or configuration of the designated objects within the indoor environment 306b relative to the previously determined condition, location, placement, and/or configuration of the designated objects within the indoor environment 304a as indicated within the baseline property condition data 308a. For example, if a designated object is not detected in the same location within the indoor environment 304b as was previously detected within the indoor environment 306a, the autonomous device 120 may initiate a set of supplemental monitoring techniques to determine if the occupant has made other changes to the property 101 during the rental period. In this regard, detected changes within the indoor environment 306b relative to the indoor environment 306a can be used to automatically initiate monitoring techniques that can be used to identify other types of changes relating to the property condition after the rental period. As an example, if the occupant has unplugged and/or disconnected an electronic device during the rental period, the autonomous device 120 may confirm that this was the case in order to reduce the likelihood of a false positive determination by the control unit 110 that the electronic device is non-functional because it has become undetectable over the network 105.

As described above, the autonomous device 120 may use the collected data to generate present property condition data 308b for the designated objects that were previously monitored within the indoor environment 306a. The present property condition data 308b may include present statuses for each designated object. In the example depicted, the present property condition data 308b specifies, much like the baseline property condition data 308a, a device and a corresponding object status.

The statuses of the designated objects in this example indicate actions that should be taken based on the physical condition of the object. As depicted, the status for the object "STOVE" is "CLEAN," the statuses for the objects "CARPET" and "BEDSHEETS" are "NEED TO BE CLEANED," and the status for the object "TOILET" is "DAMAGED." In this example, the stove may not have been used by the occupants during the rental period, whereas the carpet and bedsheets may have been extensively used, resulting in them becoming dirty. The autonomous device 120 also determines that the toilet may be damaged based on, for example, detecting visible physical damage in a captured photograph during deployment.

Once the autonomous device 120 has generated the present property condition data 308b, status information included within the present property condition data 308b can be used to generate customized notifications for performing subsequent inspections and/or maintenance operations in the property 101. In the example depicted, the autonomous device 120 may generate a notification 310 that identifies the designated objects that are determined to require cleaning or maintenance.

In other examples, the notification 310 may additionally include historical information associated with the designated objects determined based on data collected by the sensors 132 (e.g., event logs associated with an HVAC system of the property 101, detected changes in ambient temperature during the rental period, energy consumption during the rental period). In such examples, the notification 310 may include associated information that provides a system administrator with context to the present status information included within the present property condition data 308b.

As described above with respect to FIG. 1, the autonomous device 120 may transmit the notification 310 to the applications server 150 and/or the user device 140. For instance, the notification 310 may be provided for output on the user device 140 and used by the user 102 to more efficiently perform an inspection and/or a maintenance operation at the property 101. As an example, the information included with in the notification 310 may indicate devices or regions within the property 101 that require special attention based on their determined present status and other devices or regions that are determined to be in good condition, and therefore require less attention from the user 102. In this example, the notification 310 can be used by the user 102 to more efficiently identify issues with the property. In another example, the information included within the notification 310 may indicate devices or regions within the property 101 that requires maintenance (e.g., cleaning, replacement, fixing, etc.). In this example, the notification 310 can be used by the user to navigate the property 101 without having to check every device or object within the property 101.

Although the descriptions above refer to an exemplary implementation of the system 100, the system 100 may include various optional features. In some implementations, the autonomous device 120 may be capable of performing maintenance and/or monitoring tests to verify the operation of designated objects in determining their statuses. In such implementations, the autonomous device 120 may be capable of transmitting control signals over the network 105 to various network-enabled devices to determine if they are functioning properly. For example, the autonomous device 120 may transmit control signals to turn on network-enabled light bulbs to determine if they are functional. In other examples, the autonomous device 120 may transmit instruction signal to the control unit 110 to perform automated diagnostic operations on the components of the system 100 (e.g., the sensors 132, the appliances 134, etc.).

In some implementations, the autonomous device 120 may be deployed to the property 101 after it has been cleaned and/or serviced after a recent rental period. In such implementations, data captured during the third deployment of the autonomous device 120 can be used to either verify the cleaning and/or maintenance operations performed on the property 101, or to determine a baseline property condition for a subsequent rental period at the property 101. In some instances, if an extended period of time has passed between multiple rental periods, the autonomous device 120 may be periodically deployed to the property 101 in order to determine whether further cleaning and/or maintenance is required prior to a new rental.

In some implementations, the autonomous device 120 may perform one or more follow-up deployments at the property 101. For example, once the property 101 has been cleaned after a recent rental period, the autonomous device 120 may be deployed once again to the property 101 to determine if the property condition data collected after the cleaning operation matches, or at least coincides with, the baseline property condition data 308a collected prior to the rental period. This comparison can then be used to determine if the cleaning operation was sufficient to revert the property condition back to its original condition before the rental period, determine if permanent damage has been done to the property 101 that require additional maintenance and/or cleaning, among other types of information. In this regard, the data collected by the autonomous device 120 can be used to determine progressive deterioration of the property condition after multiple rentals.

Figure 4:
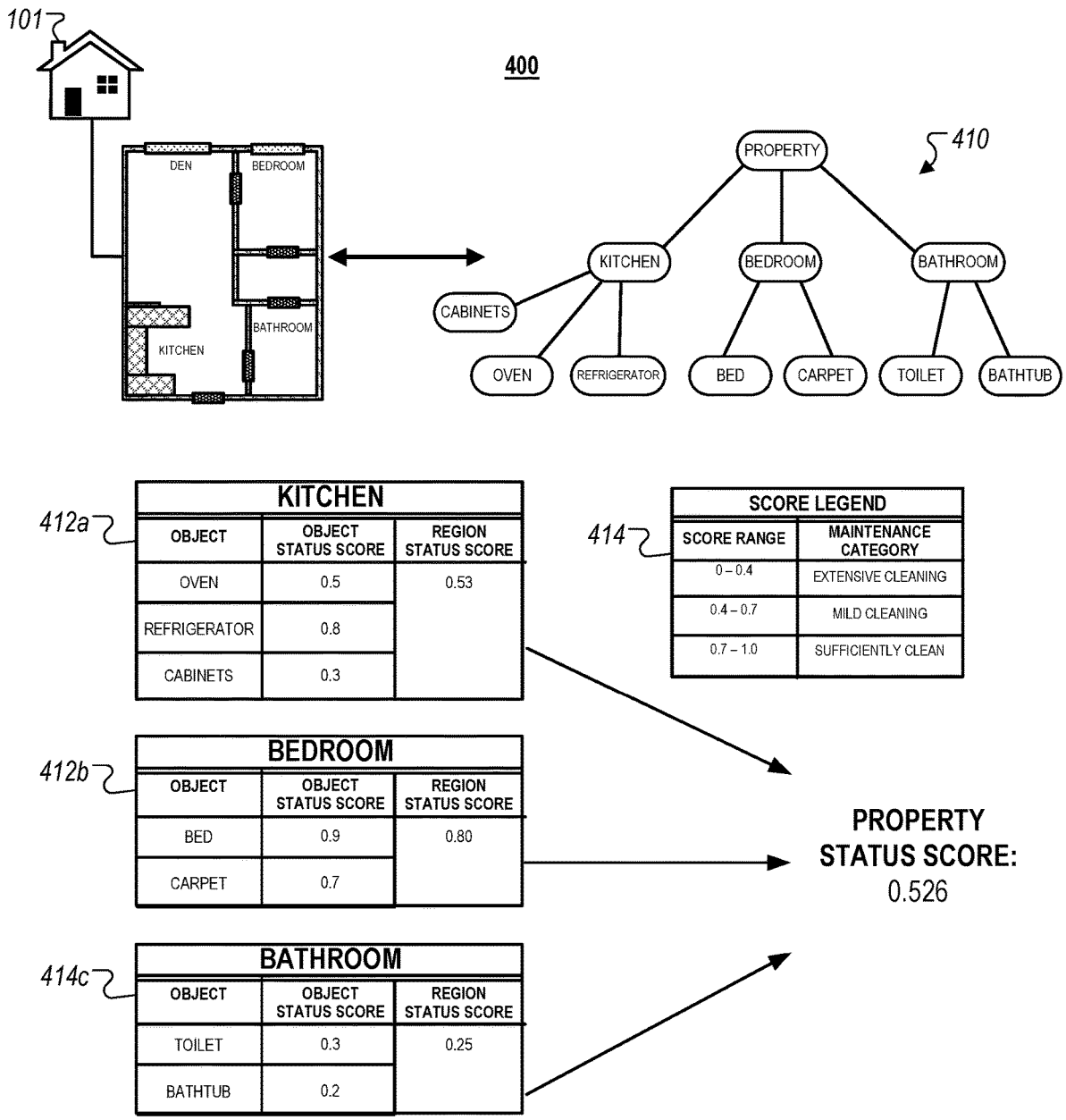
FIG. 4 illustrates an example of a hierarchal status information associated with the condition of a property.

FIG. 4 illustrates an example of a system 100 that is capable of generating a status hierarchy 410 associated with the condition of a property (e.g., the property 101). In some implementations, the system 400 may be a sub-system of the system 100 described above. In other implementations, the system 400 may be a distinct system from the system 100, but may operate within a more general system that also includes other systems described throughout.

In general, the system 400 may use aggregation techniques to identify granular information associated with a property condition. The hierarchy 410 categorizes different designated objects to be monitored by the autonomous device 120 based on their respective locations within the property 101.

The category assignments within the hierarchy 410 may be made based on determined locations of the objects within known regions of the properties. For example, during an initial registration phase, the autonomous device 120 may be configured to segment the indoor environment (e.g., the indoor environment 306a) of the property 101 into distinct regions. In some implementations, the region designations may be based on, for example, configurations provided by the property management company. Alternatively, in other implementations, the region designations may be automatically determined by autonomous device 120 based on surveying the property premises.

In some implementations, the assignments indicated within the hierarchy 410 may be periodically adjusted based on detected changes in the locations of designated objects within the 101. For example, at the start of each deployment, the autonomous device 120 may survey the indoor environment of the property 101 to identify location changes of the designated objects. The autonomous device 120 may then adjust the hierarchy to reflect the updated locations.

The system 400 may use the classifications within the hierarchy 410 to combine individual statuses of designated objects in the same region to determine combined statuses for regions of the property (e.g., a region status) and the entirety of the property 101 (e.g., a property status). In the example depicted, the system 400 computes numerical status scores that each represent a particular maintenance category. As depicted in the table 414, each maintenance category corresponds to a range of scores such that the system 100 may determine a maintenance category for a designated object based on its computed status score.

In the example depicted, objects "CABINETS," "STOVE" and "REFRIGERATOR" are assigned to the category "KITCHEN," objects "BED" and "CARPET" are assigned to the category "BEDROOM," and objects "TOILET" and "BATHTUB" are assigned to the category "BATHROOM." The system 400 may compute a status score for a designated object based on identifying and/or recognizing a set of visual attributes indicating a physical condition of the designated object. For example, the system 400 combines the individual status scores for objects in regions such as "KITCHEN," "BEDROOM," and "BATHROOM," which are specified in tables 412a, 412b, and 412c, respectively. In this example, the system 400 computes the average of the individual status scores of designated objects within a region to compute a region status score for the region. For instance, the value of the region status score of the region "KITCHEN" is "0.53," whereas the region status score of the region "BEDROOM" is "0.80," and the region status score of the region "BATHROOM" is "0.25." In this example, the corresponding maintenance category assigned to the region "KITCHEN" is "MILD CLEANING," whereas the maintenance categories for the regions "BEDROOM" and "BATHROOM" are "SUFFICIENTLY CLEAN" and "EXTENSIVE CLEANING," respectively. Thus, based on this determination, the system 400 determines that the bedroom is the cleanest, whereas the bathroom is the least clean.

The system 400 may also combine the individual region status scores to compute an overall property status score for the entire property 101. In the example depicted, the system 400 computes the average of the region status scores for the regions "KITCHEN," "BEDROOM," and "BATHROOM" to determine that that the value of the property status score is "0.526," indicating that the maintenance category for the property 101, on average, is generally "MILD CLEANING."

In some implementations, the techniques illustrated in FIG. 4 can be used to determine cleaning fees to be charged to an occupant based on the determined property condition after completion the rental period. In such implementations, the occupant may be charged a cleaning fee if, for example, the system 400 computes a property status score that exceeds a predetermined threshold value. The data captured by the autonomous device 120 can then be provided as evidence of the property condition at the time the occupant vacated the premises. In some instances, the amount of the cleaning fee can be adjusted based on the value of the computed property status score and/or region status score (e.g., a high cleaning fee for a high status score value, and a low cleaning fee for a low status score value).

Figure 5:
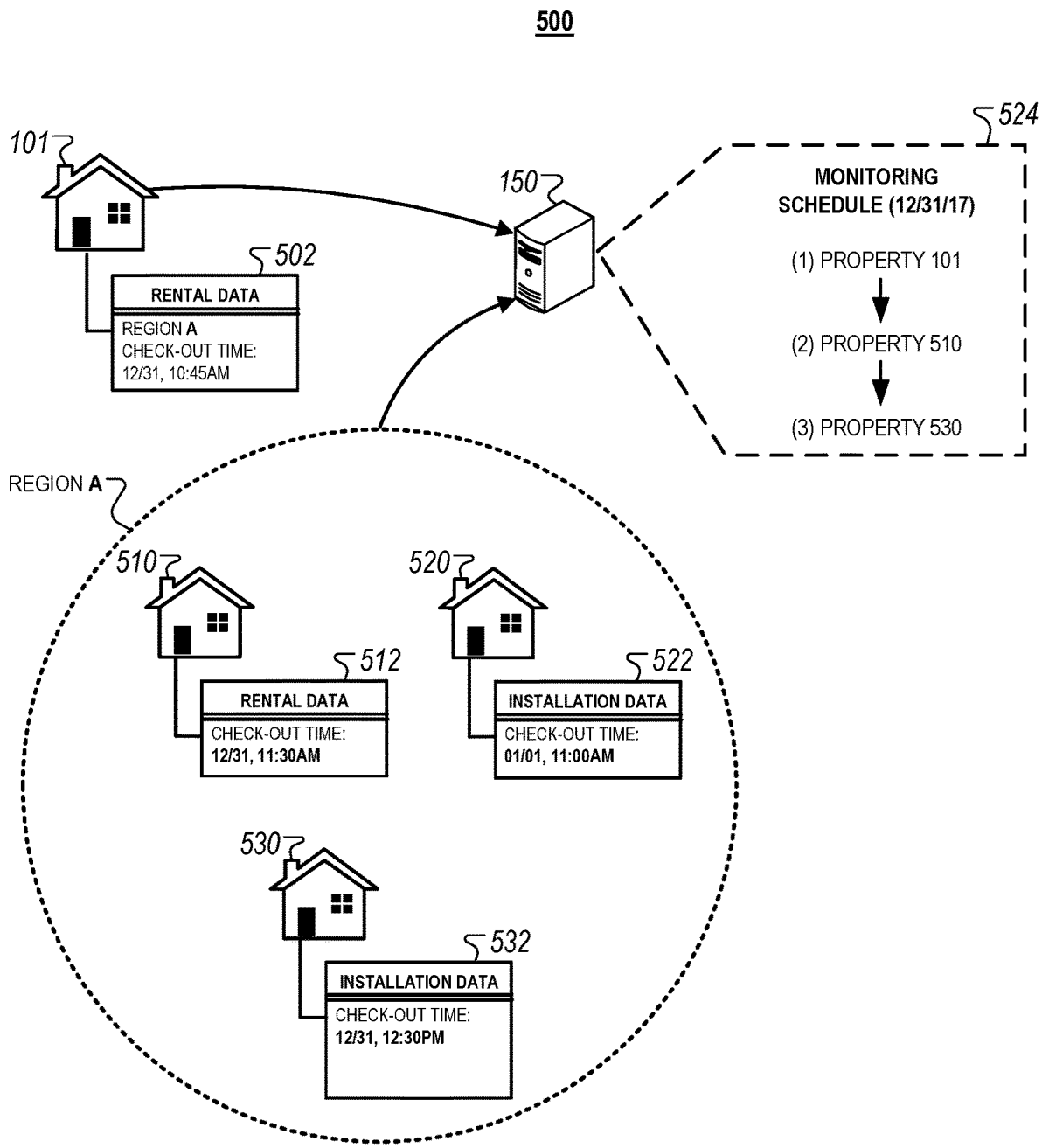
FIG. 5 illustrates an example of a system that is capable of aggregating property condition information from multiple properties in a region.

FIG. 5 illustrates an example of a system 500 that is capable of aggregating rental data from multiple properties 101, 510, 520, and 530 within a single region (e.g., Region A). The region A may represent any geographical area defined by a specified boundary. For example, the region A may represent a local jurisdiction, municipality, or neighborhood. The properties 101, 510, 520, and 530 may be managed by the same property management company. In some implementations, the system 500 may be a sub-system of the system 100 described above. In other implementations, the system 500 may be a distinct system from the system 100 that operates within a more general system.

In general, the system 500 may analyze rental data obtained from multiple properties located within a single region to optimize monitoring operations performed across all properties. In the example depicted, the application server 150 may initially obtain rental data 502, 512, 522, and 532 from the properties 101, 510, 520, and 530, respectively. The obtained rental data indicate check-out time information for ongoing rental periods at the corresponding properties. The application server 150 may then use the check-out time information to generate a deployment schedule 524 for an autonomous device (e.g., the autonomous device 120) that is deployed to multiple properties within the same region (e.g., the region A). In this example, the system 500 compares the check-out times at each property to determine an order in which to deploy the autonomous device 120 to the different properties.

In some implementations, the system 500 may be capable of using various pattern recognition and/or data aggregation techniques to identify maintenance patterns within the property condition data obtained from each of the properties within a single region. For example, the system 500 may identify the mostly commonly occurring post-rental issues within each of the properties based on status information included within the obtained property condition data. In other examples, the system 500 may identify the types of objects that frequently require maintenance, commonly occurring property maintenance issues, among others.

In some implementations, the system 500 may be capable of using the illustrated techniques to automatically determine appropriate schedules for different types of individuals that visit properties within a single region after the end of a rental period. For example, the system 500 may determine one schedule for personnel that clean the property, another schedule for maintenance personnel that provide repair services within the property, and another schedule for inspectors that inspect the condition of the property. In this example, the system 500 may designate different time periods for the various schedules so that they do not conflict with another (e.g., cleaning staff can be scheduled to visit the property prior to inspectors).

Figure 6:
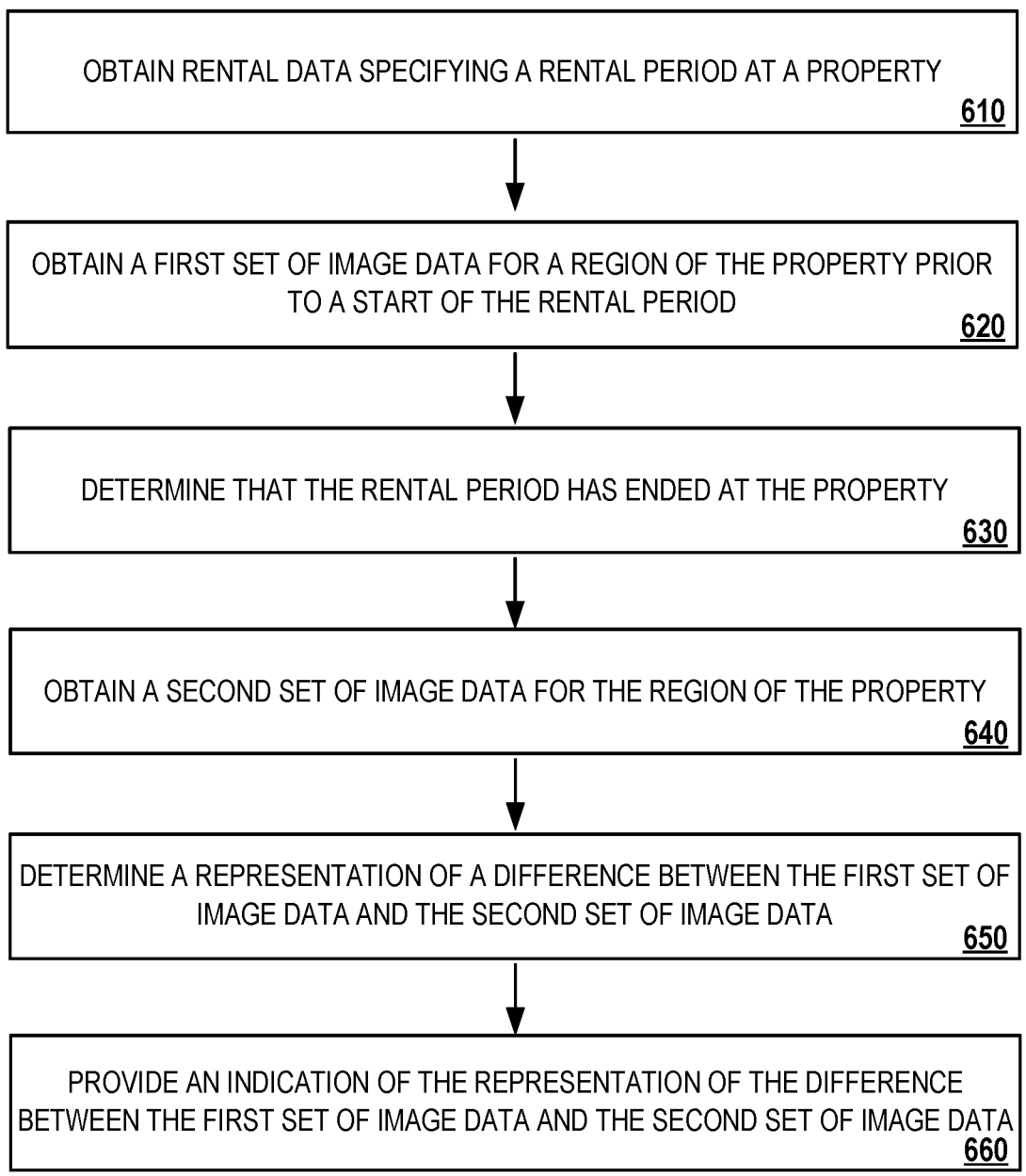
FIG. 6 illustrates an example of a process for tracking the condition of a property in relation to a rental period of the property.

FIG. 6 illustrates an example of a process 600 for tracking the condition of a property in relation to a rental period of the property. Briefly, the process 600 can include the operations of obtaining rental data specifying a rental period at a property (610), obtaining a first set of image data for a region of the property prior to a start of the rental period (620), determining that the rental period has ended at the property (630), obtaining a second set of image data for the region of the property (640), determining a representation of a difference between the first set of image data and the second set of image data (650), and providing an indication of the representation of the difference between the first set of image data and the second set of image data (660).

In general, the process 600 is described below in reference to the system 100, although any property monitoring system can be configured to perform the operations of the process 600. For example, in some implementations, the operations of the process 600 are performed using a monitoring system that includes stationary cameras that are placed at specified locations of the property and that collect image and/or video data to perform the property condition monitoring discussed throughout this document. In other implementations, the operations of the process 600 are performed using a monitoring system that includes an autonomous device, such as the system 100, which includes the autonomous device 120.

Additionally, in some implementations, the operations of the process 600 can be performed by a single component of a property monitoring system. For instance, the operations of the process 600 can be performed autonomous device 120, the control unit 110, or the application server 150. As an example, data collected by the sensors 132 and/or the autonomous device 120 can be transmitted to control unit 110 for local property condition monitoring, or alternatively, to the application server 150 for remote property condition monitoring. In other implementations, the operations of the process 600 can be performed by multiple components of a property monitoring system. For instance, the operations of the process 600 can be performed by a combination of the control unit 110, the autonomous device 120, and/or the application server 150. As an example, the autonomous device 120 can collect property condition data 122, the control unit 110 can process the data collected by the autonomous device 120 for transmission to the application server 150, and the application server 150 can schedule maintenance operations in relation to a rental period based on data stored in the repository 152. While various implementations can be configured to perform the operation of the process 600, the descriptions below are in reference to the autonomous device 120 for brevity and simplicity.

In more detail, the process 600 can include the operation of obtaining rental data specifying a rental period at a property (610). The autonomous device 120 can obtain rental data associated with the property 101 from the application server 150. As described above, the rental data can be stored in the repository 152 and can indicate property information (e.g., property type), rental information (e.g., checkout time, type of rental, rental period, etc.), and monitoring information (e.g., last performed monitoring operation). The rental period can include a start time and an end time that are used by the autonomous device 120 to determine when a renter will begin occupying the property 101.

The process 600 can include the operation of obtaining a first set of image data for a region of the property prior to a start of the rental period (620). The autonomous device 120 can obtain a first set of image data for a region of the property 101 (e.g., living room, bedroom, kitchen, etc.). In the example depicted in FIG. 3, the first set of image data can represent images that are collected by the autonomous device 120 while collecting the baseline property condition data 308*a* prior to the start of the rental period (e.g., 3 PM at Dec. 21). As discussed above, the images can be collected by on-board cameras of the autonomous device 120 while navigating through an indoor environment 306*a* of the property 101. For example, the autonomous device 120 can capture images of objects located within each region of the property 101 (e.g., oven, carpet, toilet, bedsheets, etc.).

The autonomous device 120 can use different techniques to determine the start of the rental period at the property 101. In some implementations, the start of the rental period is identified in the rental data obtained by the autonomous device 120 in step 610. For example, as shown in FIG. 3, the rental data can identify a confirmed check-in time of the occupant 302, which the autonomous device 120 uses to predict the expected time that the property 101 will be occupied. For example, the autonomous device 120 can be configured to automatically navigate a path in the property 101 within twelve to fourteen hours prior to a check-in time of the occupant 302. In such implementations, the autonomous device 120 can obtain the first set of image data while navigating the path and within a threshold time span from the start of the rental period. For example, the autonomous device 120 can automatically navigate through the indoor environment 306*a* of the property 101 within twelve to twenty-four hours of a check-in time associated with the rental period. In this example, the autonomous device 120 uses the threshold time span to initiate a monitoring instruction without requiring a manual instruction. In other implementations, the autonomous device 120 can perform the monitoring operation in response to receiving an instruction from a property administrator. For example, instead of automatically performing the monitoring operation and collecting the first set of image data, the autonomous device 120 can instead wait to receive an instruction from the user device 140, and collect the first set of image data in response to receiving the instruction after a previous renter has checked out of the property 101 and before a prospective tenant checks into the property 101.

In some implementations, the autonomous device 120 collects the first set of image data after a previous tenant has checked out of the property 101 but before maintenance personnel is scheduled to visit the property 101 to clean the property 101. For example, the control unit 110 can determine that the occupant has vacated the premise based on sensor data collected by the sensors 132. In response to this determination, the control unit 110 can provide an instruction to the autonomous device 120 to collect the first set of image data before maintenance personnel arrives at the property 101. In this example, if the previous tenant's checkout time is around 11 AM and the maintenance personnel is scheduled to visit the property around 2 PM, then the autonomous device 120 can be configured to collect the first set of image data between 12 PM and 1 PM. In this example, the first set of image data collected by the autonomous device 120 can be used to determine, for instance, regions of the property 101 that need cleaning, objects that have been damaged and/or need special attention, among others. For instance, in the example depicted in FIG. 3, the autonomous device 120 can use object recognition techniques to the first set of image data to determine objects within the property 101 that need to be cleaned and generate the notification 310. As described above, the notification 310 can be provided to the user device 140, or alternatively, to a user device of the maintenance personnel before he/she is scheduled to visit the property 101. In this regard, the first set of image data collected by the autonomous device 120 can be used to identify objects and/or regions of the property 101 that require special attention as the maintenance personnel cleans the property 101.

The process 600 can include the operation of determining that the rental period has ended at the property (630). The autonomous device 120 can determine that the rental period at the property 101 has ended using various techniques. In some implementations the determination is made based on a confirmed check-out time associated with the rental period, which is specified in the rental data obtained in step 610. In the example depicted in FIG. 3, the autonomous device 120 determines that the rental period ends based on the check-out time that is confirmed by the occupant 302 on the interface 304b. In this example, the autonomous device 120 can determine that the rental period ends after a specified time period after the confirmed check-out time (e.g., two-hours) to allow the occupant 302 to vacate the property 101. In other implementations, the determination can additionally, or alternatively, be made based on monitoring occupancy of the property 101 during the end of the rental period. For example, the autonomous device 120 can monitor various types of sensor data collected by the sensors 132 (e.g., presence data, occupancy data, appliance usage data) to determine whether the property 101 is presently occupied by an individual. In this example, the autonomous device 120 can monitor the sensor data in real-time, monitor the sensor data at a specified interval (e.g., every ten minutes), or monitor the sensor data for the occurrence of specific events that are correlated with the occupant 302 vacating the property 101 (e.g., door opening and closing, user input indicating confirmation of vacating, etc.). In some instances, the sensor data can be used to confirm that the occupant 302 has actually vacated the property 101 after his/her scheduled checkout time. For example, after the control unit 110 has determined that the checkout time has passed, the control unit 110 and/or the autonomous device 120 can monitor the sensor data to verify that the property 101 is actually vacant. In some instances, if the property 101 is determined to still be occupied even after a scheduled check-out time, the control unit 110 can determine that the occupant 302 has not yet left the premises of the property 101.

The process 600 can include the operation of obtaining a second set of image data for the region of the property (640). The autonomous device 120 can obtain the second set of images data in response to determining that the property 101 is presently unoccupied. As discussed above, the second set of images data can be collected by the autonomous device 120 while navigating the property 101 after a recent rental period. In the example depicted in FIG. 3, the second set of images data can be included in the present property condition data 308b. The second set of image data can be used to determine a present condition of a region of the property 101 after the rental period has ended. For example, the second set of image data can indicate whether certain objects have been used.

The process 600 can include the operation of determining a representation of a difference between the first set of image data and the second set of image data (650). The autonomous device 120 can determine the representation of the difference between first and second sets of image data based on comparing corresponding images of the region of the property prior to and after the rental period. For instance, the autonomous device 120 can be configured to follow predetermined route along the property 101 while conducting a maintenance operation such that each of the first and second sets of image data include corresponding images that can be compared against one another. As an example, when collecting image data of the kitchen of the property 101, the autonomous device 120 can be configured to take an image of the sink, an image of the refrigerator, and an image of the floor each time it performs a monitoring operation. In this example, each of the first and second sets of image data include images of the sink, the refrigerator, and the floor, which can then be individually compared to identify differences (e.g., differences in the physical conditions of objects). The autonomous device 120 can be configured to take these images in the same manner to minimize the effect of differences between images that are not attributable to the condition of the property, such as, ambient lighting conditions, shooting angles, etc. For instance, the autonomous device 120 can be pre-configured to take images to minimize the effect of such extraneous factors that might image object recognition and image processing when comparing the two images.

In the example depicted in FIG. 3, the representation of the difference between the first and second image data is used to determine objects within regions of the property 101 that require cleaning and/or maintenance. In this example, the baseline property condition data 308a includes a first set of images of specified objects that are collected prior to the occupant 302 checking into the property 101 (e.g., prior to the start of the rental period). Additionally, the present property condition data 308b includes a second set of images of the specified objects that are collected after the occupant 302 has checked out of the property 101. The autonomous device 120 uses various image processing techniques to compare object attributes (e.g., surface texture of an object, location of an object within the property 101, present configuration/structure of an object, etc.) within corresponding images to determine whether an object needs to be cleaning. In the example depicted in FIG. 3, the autonomous device 120 determines that the carpet needs to be cleaned based on an image of the carpet in the second set of image data indicating a stain that is not present in the image of the same carpet in the first set of image data. As another example, the autonomous device 120 determines that the bedsheets need to be cleaned based on an image of the bed in the second set of image data indicating that the bed is not made (e.g., the bed has been used by the occupant 302) whereas an image of the same bed in the first set of image data includes a bed that is made with clean sheets. In this example, the autonomous device 120 can determine if the bed has been used using indicators such as, positioning of the bedsheets on the bed, locations of pillows on the bed, among others.

The process 600 can include the operation of providing an indication of the representation of the difference between the first set of image data and the second set of image data (660). The autonomous device 120 can provide an indication to, for instance, the application server 150, the user device 140, or another device that is associated with a monitoring system of the property 101. The indication can include a list of objects and/or regions that require cleaning. As discussed above, these objects and/or regions can be identified based on the representation of the difference between the first and second image data. For instance, in the example depicted in FIG. 3, the indication is the notification 310, which includes list of objects that have been identified as requiring cleaning. In this example, the indication is provided to the application server 150, which then transmits the notification 310 to the user device 140. In other examples, the notification 310 can be transmitted to a computing devices of maintenance personnel that are assigned to cleaning the property 101 after a rental period. In such examples, the notification 310 can be provided to the computing devices of maintenance personnel prior to arrival at the property 101 so that they can have a prioritized list of objects and/or regions to focus on while cleaning the property 101.

In some implementations, the autonomous device 120 can determine a cleanliness parameter for objects and/or regions of the property. The value of a cleanliness score can be based on the representation of the difference between corresponding images in the first and second sets of image data and represent a determined likelihood that an object and/or region requires cleaning. In the example depicted in FIG. 4, the value of the cleanliness parameter for an object can be represented as the value of an object status score for an individual object. As another example, the value of the cleanliness parameter for a region can be represented as the value of a region status score for a region that includes multiple objects. In this example, each cleanliness parameter has a numerical value that represents a likelihood whether an object or region is clean. For instance, the cleanliness parameter for the object "OVEN" in the table 412a has a value of "0.5" and the cleanliness parameter for the region "KITCHEN" has a value of "0.53." In some instances, a cleanliness parameter can also be computed for the entire property based on combining cleanliness parameters for regions of the property. In the example depicted in FIG. 4, the cleanliness parameter for the entire property has a value of "0.526."

In some implementations, the cleanliness parameter can be assigned categorical labels instead of numerical values to represent the likelihood of whether a corresponding object or region requires cleaning. For example, as shown in table 414, the categorical labels can include "EXTENSIVE CLEANING," "MILD CLEANING," and "SUFFICIENTLY CLEAN." In such implementations, the labels can be assigned based on computed values of object status scores and/or region status scores, as shown in FIG. 4. Alternatively, the labels can be assigned based on using image processing techniques to identify changes to the physical condition of an object or region before and after the rental period. For example, if an image of a bed in the first set of image data indicates that the bed is made and not used, and an image of the bed in the second set of image data indicates that the bed has not likely been used during the rental period, then then the categorical label assigned to the cleanliness parameter for the bed can be "SUFFICIENTLY CLEAN." In another example, if an image of a carpet in the second image data includes a carpet stain that was not present in the image of the carpet in the first image data, then the stain is determined to have been introduced during the rental period. In this example, depending on the size and type of the stain, the cleanliness parameter for the carpet can be set to either "EXTENSIVE CLEANING" or "MILD CLEANING."

In some implementations, the rental data obtained in step 610 specifies inspection criteria for monitoring a physical condition of the region of the property 101. The inspection criteria can include different predetermined conditions of the region of the property 101, and one or more maintenance actions corresponding to each of the different predetermined conditions. For example, as shown in the table 414, the different predetermined conditions can be "EXTENSIVE CLEANING," "MILD CLEANING" and "SUFFICIENTLY CLEAN." In this example, the maintenance actions can include cleaning actions that are associated with each predetermined conditions that are to be performed on the object and/or region by maintenance personnel. In some instances, a property administrator can customize the maintenance actions that are associated with each predetermined condition to customize the level of cleaning of the property 101 after a rental period. For example, maintenance actions associated with "EXTENSIVE CLEANING" can specify the application of specific cleaning techniques that are specific to a corresponding object, region, or property. In this respect, the rental data can be used by the property administrator to customize maintenance operations for specific objects, regions, or properties based on physical conditions determined by the autonomous device 120.

In some implementations, the process 600 further includes the operation of determining that a present physical condition of a region matches a predetermined physical condition specified in the rental data. For instance, in the example depicted in FIG. 4, the autonomous device 120 determines that the present physical condition of the refrigerator is "MILD CLEANING" based on the value of its object status score being equal to "0.8." In this example, the present physical condition is matched against the corresponding predetermined physical condition in the rental data to identify associated maintenance actions associated with the corresponding predetermined physical condition. In this example, the maintenance action for the "MILD CLEANING" condition can include a wet surface wipe down by applying a cleaning reagent, while the maintenance action for the "SUFFICIENTLY CLEAN" condition can include a dry surface wipe down only without applying a cleaning agent. The maintenance action that corresponds to the physical condition of the refrigerator can be included in the indication that is provided for output (e.g., in the notification 310).

In some implementations, the process 600 further includes the operation of determining that the representation of the difference between the first set of image data and the second set of image data satisfies a predetermined threshold difference. The predetermined threshold difference can identify a number of objects within the region of the property 101 that are determined to have been used during the rental region. In such implementations, the cleanliness parameter can represent a high likelihood that the region requires cleaning if the representation of the difference between the first and second sets of image data is determined to satisfy the predetermined threshold difference. For example, the autonomous device 120 can compare corresponding images from the first and second sets of image data collected in the kitchen of the property 101 to determine that the oven, the refrigerator, and the cabinets have been used during the rental period. In this example, if the threshold difference specifies two changed objects in a region, then the autonomous device 120 determines that the representation of the difference between the first and second images satisfies the threshold difference since three objects in the kitchen were determined to be used during the rental period. The objects can be referenced as known objects in monitoring system data associated with the property 101. The known objects can be identified and registered when the autonomous device 120 is configured to operate with the system 100. For example, the property administrator may collect pictures of objects located within the property 101 and provide information that allows the autonomous device 120 to identify the objects during a monitoring operation.

In some implementations, the techniques described herein can be used to determine the materials that may be needed to perform maintenance on the property 101. For example, if the autonomous device 120 determines that the carpet is heavily stained, a notification provided to maintenance personnel after a monitoring operation is completed after the occupant checks out can specify a certain type of cleaner and/or supplies that can be used to property clean the property 101. As another example, if a window of the property 101 is determined to be is broken, then this may be indicated in the notification so that maintenance personnel are aware of the defect and do not need to spend time investigating the window as repair may be performed by a different entity (e.g., property repair personnel).

In some implementations, the system 100 can aggregate monitoring system data collected from different properties that are located in a certain geographic region, as discussed above with respect to FIG. 4. In such implementations, the application server 150 can process the collected data to determine various indicators such as an efficiency indicator representing how quickly a particular property is cleaned after a temporary occupancy period. The application server 150 can determine other types of statistics, such as the number of appliances that require maintenance or repair after a certain number of maintenance operations and/or occupancy period.

In some implementations, the autonomous device 120 can be configured to perform a second-pass monitoring operation after maintenance personnel has serviced the property 101 once an occupancy period has ended. In such implementations, data collected by the autonomous device 120 can be used to confirm that the maintenance personnel properly cleaned the property 101, determine whether certain appliances, regions, or objects need further cleaning, or collect documentation of the maintenance operation. In some instances, the property condition monitoring techniques discussed above to assess the condition of the property 101 after an occupancy period can be used to a means to evaluate the service quality of maintenance personnel assigned to clean the property 101. For example, the autonomous device 120 can collect images of the property 101 prior to and after the performance of a monitoring operation and determine the condition of the property 101 has changed after the maintenance operation.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computing devices, the method comprising:
   transmitting, by the one or more computing devices and to an autonomous device, a first instruction that causes the autonomous device to collect sensor data from a property;
   obtaining, by the one or more computing devices and from the autonomous device, one or more cleanliness parameters determined using the sensor data collected by the autonomous device, wherein each of the one or more cleanliness parameters is associated with one or more objects located in the property;
   determining, by the one or more computing devices, a set of scores for the one or more objects using the one or more cleanliness parameters, wherein the set of scores identify predicted levels of cleanliness for the one or more objects;
   determining, by the one or more computing devices and using the set of scores, a maintenance action to be performed at the property;
   receiving, by the one or more computing devices, data indicating that the maintenance action has been performed; and
   in response to receiving the data indicating that the maintenance action has been performed, transmitting, by the one or more computing devices and to the autonomous device, a second instruction that causes the autonomous device to navigate to one or more regions of the property and to collect additional sensor data from the property.

2. The method of claim 1, wherein the first instruction causes the autonomous device to collect the sensor data during a rental period when the property is rented.

3. The method of claim 2, wherein:
the rental period is defined in part by a check-out time after which the property is vacant; and
the sensor data is collected by the autonomous device after the check-out time.

4. The method of claim 1, further comprising:
identifying, by the one or more computing devices, a rental period during which the property is rented, wherein the rental period is defined in part by a check-in time after which the property is occupied; and
transmitting, by the one or more computing devices and to the autonomous device, a preliminary instruction that causes the autonomous device to collect preliminary sensor data from the property before the check-in time.

5. The method of claim 4, further comprising:
obtaining, by the one or more computing devices and from the autonomous device, the preliminary sensor data collected by the autonomous device; and
determining, by the one or more computing devices, a baseline condition of the one or more objects using the preliminary sensor data.

6. The method of claim 5, further comprising:
determining, by the one or more computing devices, a current condition of the one or more objects using the one or more cleanliness parameters; and
comparing, by the one or more computing devices, the baseline condition and the current condition;
wherein the set of scores is determined based on the comparing of the baseline condition and the current condition.

7. A system comprising:
one or more computing devices; and
one or more storage devices storing instructions that cause the one or more computing devices to perform operations comprising:
transmitting, by the one or more computing devices and to an autonomous device, a first instruction that causes the autonomous device to collect sensor data from a property;
obtaining, by the one or more computing devices and from the autonomous device, one or more cleanliness parameters determined using the sensor data collected by the autonomous device, wherein each of the one or more cleanliness parameters is associated with one or more objects located in the property;
determining, by the one or more computing devices, a set of scores for the one or more objects using the one or more cleanliness parameters, wherein the set of scores identify predicted levels of cleanliness for the one or more objects;
determining, by the one or more computing devices and using the set of scores, a maintenance action to be performed at the property;
receiving, by the one or more computing devices, data indicating that the maintenance action has been performed; and
in response to receiving the data indicating that the maintenance action has been performed, transmitting, by the one or more computing devices and to the autonomous device, a second instruction that causes the autonomous device to navigate to one or more regions of the property and to collect additional sensor data from the property.

8. The system of claim 7, wherein the first instruction causes the autonomous device to collect the sensor data during a rental period when the property is rented.

9. The system of claim 8, wherein:
the rental period is defined in part by a check-out time after which the property is vacant; and
the sensor data is collected by the autonomous device after the check-out time.

10. The system of claim 7, wherein the operations further comprise:
identifying, by the one or more computing devices, a rental period during which the property is rented, wherein the rental period is defined in part by a check-in time after which the property is occupied; and
transmitting, by the one or more computing devices and to the autonomous device, a preliminary instruction that causes the autonomous device to collect preliminary sensor data from the property before the check-in time.

11. The system of claim 10, wherein the operations further comprise:
obtaining, by the one or more computing devices and from the autonomous device, the preliminary sensor data collected by the autonomous device; and
determining, by the one or more computing devices, a baseline condition of the one or more objects using the preliminary sensor data.

12. The system of claim 11, wherein the operations further comprise:
determining, by the one or more computing devices, a current condition of the one or more objects using the one or more cleanliness parameters; and
comparing, by the one or more computing devices, the baseline condition and the current condition;
wherein the set of scores is determined based on the comparing of the baseline condition and the current condition.

13. At least one non-transitory computer-readable storage media storing instructions that cause one or more processors to perform operations comprising:
transmitting, by the one or more processors and to an autonomous device, an instruction a first instruction that causes the autonomous device to collect sensor data from a property;
obtaining, by the one or more processors and from the autonomous device, one or more cleanliness parameters determined using the sensor data collected by the autonomous device, wherein each of the one or more cleanliness parameters is associated with one or more objects located in the property;
determining, by the one or more processors, a set of scores for the one or more objects using the one or more cleanliness parameters, wherein the set of scores identify predicted levels of cleanliness for the one or more objects;
computing, by the one or more processors, an aggregate score based at least on combining one or more scores of the set of scores;
providing, by the one or more processors and to a user device, output data indicating the aggregate score;

determining, by the one or more processors and using the aggregate score, a maintenance action to be performed at the property;

receiving, by the one or more processors, data indicating that the maintenance action has been performed; and in response to receiving the data indicating that the maintenance action has been performed, transmitting, by the one or more processors and to the autonomous device, a second instruction that causes the autonomous device to navigate to one or more regions of the property and to collect additional sensor data from the property.

14. The storage media of claim 13, wherein the first instruction causes the autonomous device to collect the sensor data during a rental period when the property is rented.

15. The storage media of claim 14, wherein:
the rental period is defined in part by a check-out time after which the property is vacant; and
the sensor data is collected by the autonomous device after the check-out time.

16. The storage media of claim 13, wherein the operations further comprise:
identifying, by the one or more processors, a rental period during which the property is rented, wherein the rental period is defined in part by a check-in time after which the property is occupied; and
transmitting, by the one or more processors and to the autonomous device, a preliminary instruction that causes the autonomous device to collect preliminary sensor data from the property before the check-in time.

17. The storage media of claim 16, wherein the operations further comprise:
obtaining, by the one or more processors and from the autonomous device, the preliminary sensor data collected by the autonomous device; and
determining, by the one or more processors, a baseline condition of the one or more objects using the preliminary sensor data.

18. The storage media of claim 17, wherein the operations further comprise:
determining, by the one or more processors, a current condition of the one or more objects using the one or more cleanliness parameters; and
comparing, by the one or more processors, the baseline condition and the current condition;
wherein the set of scores is determined based on the comparing of the baseline condition and the current condition.

19. The method of claim 1,
wherein the one or more regions of the property to which the second instruction causes the autonomous device to navigate includes a region of the property where the maintenance action was performed.

20. The method of claim 1, wherein the autonomous device comprises an electronic device that is configured for autonomous movement about the property.

* * * * *

UNITED STATES PATENT AND TRADEMARK OFFICE
CERTIFICATE OF CORRECTION

| | |
|---|---|
| PATENT NO. | : 12,020,338 B2 |
| APPLICATION NO. | : 17/366444 |
| DATED | : June 25, 2024 |
| INVENTOR(S) | : John Carone |

It is certified that error appears in the above-identified patent and that said Letters Patent is hereby corrected as shown below:

In the Claims

In Claim 13, Column 30, Line 49, after "device," delete "an instruction".

Signed and Sealed this
Twentieth Day of August, 2024

Katherine Kelly Vidal
*Director of the United States Patent and Trademark Office*